United States Patent [19]

Noguchi

[11] Patent Number: 4,995,703
[45] Date of Patent: Feb. 26, 1991

[54] ACTIVE MATRIX LIQUID CRYSTAL COLOR DISPLAY PANEL HAVING SPLIT PIXEL ELECTRODES

[75] Inventor: Kesao Noguchi, Tokyo, Japan
[73] Assignee: NEC Corporation, Tokyo, Japan
[21] Appl. No.: 780,214
[22] Filed: Sep. 26, 1985

[30] Foreign Application Priority Data

Sep. 26, 1984 [JP] Japan .............................. 59-200920
Oct. 18, 1984 [JP] Japan .............................. 59-219039

[51] Int. Cl.$^5$ .............................................. G02F 1/13
[52] U.S. Cl. .................................... 350/333; 350/336; 350/339 F; 340/784
[58] Field of Search ............... 350/333, 336, 334, 335, 350/339 F; 357/32, 45; 340/784, 702

[56] References Cited

U.S. PATENT DOCUMENTS

| 4,368,523 | 1/1983 | Kawate | 350/333 |
| 4,600,274 | 7/1986 | Morozumi | 350/339 F |
| 4,728,172 | 3/1988 | Cannella | 350/336 |
| 4,775,861 | 10/1988 | Saito | 350/333 |
| 4,781,438 | 1/1988 | Noguchi | 350/339 F |
| 4,812,017 | 3/1989 | Piper | 350/339 F |

FOREIGN PATENT DOCUMENTS 0186086 7/1986 European Pat. Off. ............ 350/334
0097322 5/1985 Japan .............................. 340/784
0186823 9/1985 Japan .............................. 350/339 F

OTHER PUBLICATIONS

A. Lakatos—"Promise and Challenge of TF Silison Approaches to Active Matrix", May 1983–pp. 525-532–IEEE Transactions on Electronics Devices—vol. Ed—30, No. 5.

Primary Examiner—Stanley D. Miller
Assistant Examiner—Tai V. Duong
Attorney, Agent, or Firm—Burns, Doane, Swecker & Mathis

[57] ABSTRACT

An improved active matrix type liquid crystal display panel is provided, the liquid crystal display panel being characterized in that the one picture element, formed on an active matrix substrate, is divided into a plurality of subelements and is connected to at least two scanning or signal lines through respective switching elements disposed on each display electrode or that each pair of the neighboring picture elements belonging to different rows or columns of the matrix is staggered with respect to each other and as a result the density of picture defects can significantly be reduced and the formation of echelon images can effectively be eliminated even if an oblique or curved line is reproduced.

15 Claims, 9 Drawing Sheets

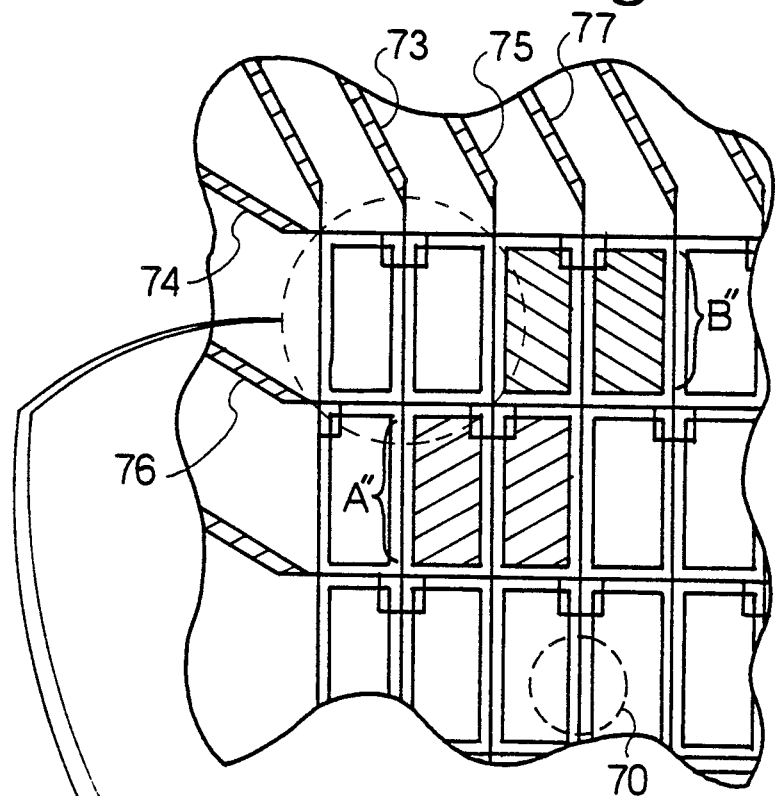
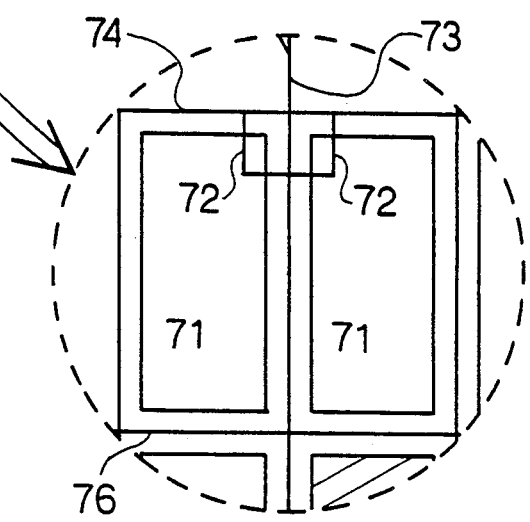
FIGURE 8

FIGURE 9
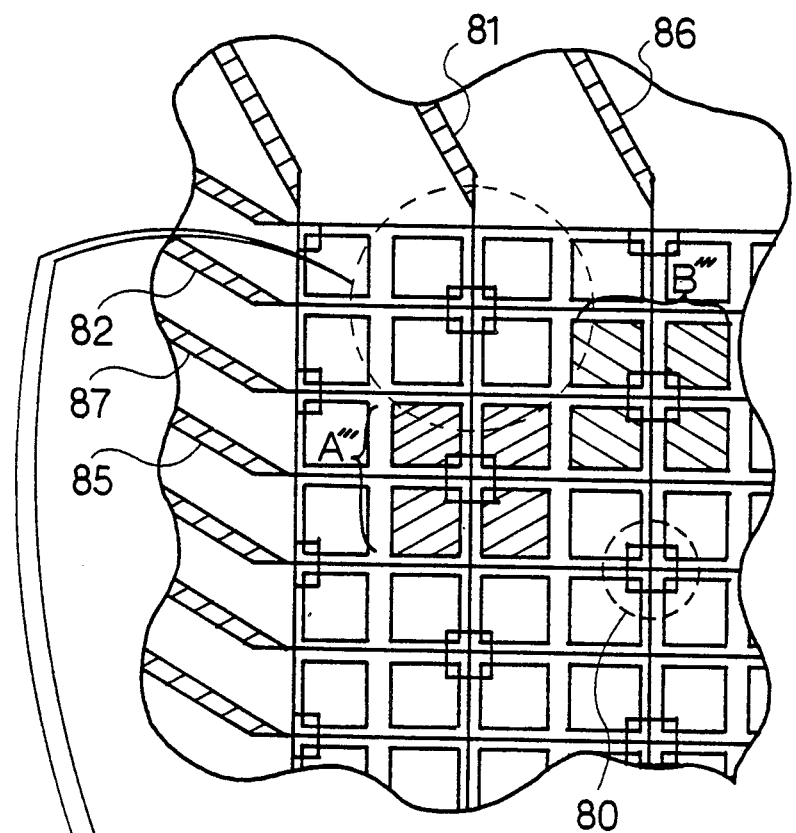
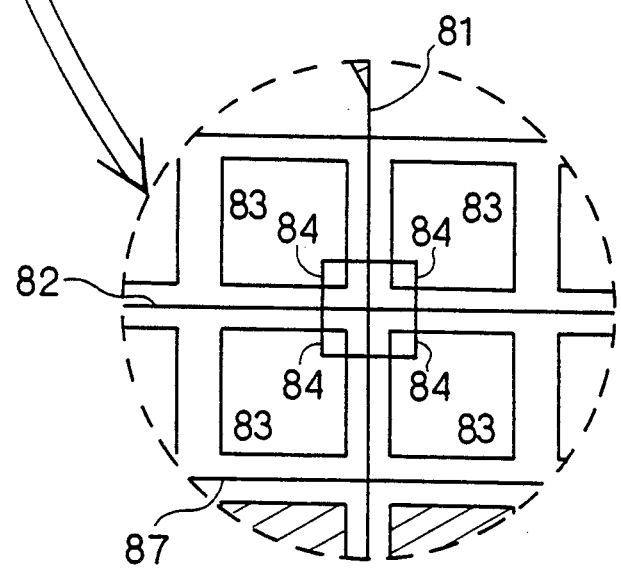

ACTIVE MATRIX LIQUID CRYSTAL COLOR DISPLAY PANEL HAVING SPLIT PIXEL ELECTRODES

BACKGROUND OF THE INVENTION

1. Field of the Invention

This invention relates to a liquid crystal display panel and more particularly pertains to an improved active matrix type liquid crystal display panel having switching elements such as a thin film transistor.

2. Description of the Prior Art

In recent years, liquid crystal display apparatuses have drawn great attention because they consume rather low electric power, the use of liquid crystal makes it possible to reduce their thickness and permits the manufacture of a large area display. Such liquid crystal display apparatuses are used, in a great extent, as the display means for wrist watch, electric calculator and other electric devices such as computers and TVs.

However, conventional twisted nematic type liquid crystal display apparatuses are incomplete in their display capacity and the rise of electric potential-contrast property. Then, in order to eliminate such disadvantages of the conventional liquid crystal display apparatus a matrix type apparatus has been developed, which is provided with non-linear elements or switching elements combined therewith. In this connection, a thin film transistor (TFT) or a diode which includes the use of amorphous silicon, polycrystalline silicon or a compound semiconductor or a varistor utilizing zinc oxide has been thoroughly examined.

Thus, a large number of matrix type display apparatuses have been developed having large areas, as means for displaying graphs, characters, images or the like. Among various kinds of flat panel display means, active matrix type liquid crystal display apparatuses have considerable potential because they permits the display of large capacities and large area and the reduction of electric power required to operate the apparatus.

Generally, a matrix liquid crystal display panel comprises an active matrix substrate provided with switching elements connected to scanning and signal lines, an electrode substrate faced thereto and a liquid crystal material filled in the space formed between these two substrates. More particularly, a typical structure of such an active matrix type display panel is disclosed in Appl. Phys., 1981, 24, 357-362, A. J. Smell, et al. and is composed of a glass substrate on which a plurality of thin film transistors (TFT: usually MOS type field effect transistor) as switching elements are mounted in a matrix form and which is covered with a transparent cover plate with liquid crystal injected between the glass substrate and the cover plate. The inner surface of the cover plate is coated with a transparent conducting layer of ITO (Indium-Tin-Oxide). The transmittance of the liquid crystal at respective picture elements is controlled by selectively driving the TFT's.

This active matrix type liquid crystal display panel makes it possible to eliminate the above mentioned disadvantages of the classical liquid crystal displays and presents an excellent rise of electric potential-contrast property and a high display capacity and permits a large area display. However, conventional active matrix panels have a large number of disadvantages such that the density of picture defects has not yet been reduced sufficiently. This is mainly due to the defects in at least one element such as switching elements, signal lines and scanning lines. This is because one picture element in the conventional display panel is composed of one switching element, one display electrode, one signal line and one scanning line.

The TFT's are, for example, formed using a polycrystalline silicon layer or an amorphous silicon layer. By use of the TFT's, the resolution of the display panel is improved to a practical extent, however, the density of picture defects has not been reduced sufficiently, since it is impossible, by the present production technique, to increase the yield of TFT's almost equal to one and therefore, the picture elements corresponding to defective TFT's appear as picture defects. For instance, if the yield of TFT's is assumed to be 99.9%, 250 picture defects appear on the display panel having 500 (rows) × 500 (columns) picture elements in a matrix. Such defective images cannot be practically used on the market. In addition, the high density of picture defects limits the application of the liquid crystal display panels only to small size displays.

In this respect, the applicant of this invention has developed a driving circuit for a liquid crystal display panel which permits the reduction of picture defects caused due to the low yield of TFT which is used as the switching element. The improved liquid crystal display panel comprises a plurality of scanning lines receiving scanning signals, a plurality of signal lines arranged orthogonally to the scanning lines and receiving driving signals, a plural sets of switching elements, each set being disposed at a crossing point of the scanning lines and the signal lines, and a plurality of liquid crystal elements coupled with the respective switching elements, characterized by having a plural number of switching elements per one picture element which is divided into a plurality of pieces (sub-elements), each piece having a display electrode coupled with one switching element, the switching elements being switched by the scanning signals to drive the associated liquid crystal display elements with the driving signals.

Thus, the picture defects caused by the fact that the picture elements are composed of single TFT per element can be eliminated effectively. However, the improved liquid crystal display panel is still incomplete and has a disadvantage such that if one wants to display an oblique line or a curved line on the display panel, an echelon image is formed because of the arrangement of the picture elements in the matrix.

Explaining this point in more detail, the conventional display panel is composed of substantially simple matrix arrangement, that is, two neighboring picture elements have a common signal or scanning line although a picture element is divided into four pieces and has four display electrodes. Therefore, it is impossible to obtain a continuous oblique or curved line and only an echelon oblique line or curved line is obtained. Furthermore, it is also difficult to reduce the number of picture defects due to the disconnection of scanning or signal lines.

Furthermore, such problems become more significant as the size of the display panel becomes larger and this kind of display panel cannot be adapted for display means of graphs and characters which have greatly been interested in and need a large display area. While it is quite difficult to produce a large number of picture elements (large area display panel) without defects.

SUMMARY OF THE INVENTION

Under the circumstances mentioned above, it is an important problem to improve the display properties of an matrix liquid crystal display panel, such that the oblique or curved line is displayed as an echelon line on the panel and that picture defects due to elements other than switching element are still high.

The principal object of this invention is to provide a matrix liquid crystal display panel which makes it possible to compensate defective picture elements.

Another object of this invention is to provide a matrix liquid crystal display panel which can provide a beautiful oblique or curved line on the panel without forming echelon lines.

A further object of this invention is to provide a matrix liquid crystal display panel which permits the increase of the display capacity while the defective picture elements are not actualized.

These objects of the invention may be effectively attained according to the following liquid crystal matrix panel.

The active matrix type liquid crystal display panel according to the present invention comprises a plurality of scanning lines receiving scanning signals, a plurality of signal lines arranged orthogonally to the scanning lines and receiving driving signals, a plural sets of switching elements, each switching element being disposed at a crossing point of the scanning lines and the signal lines and a plurality of liquid crystal elements coupled with respective switching elements and is characterized in that at least two signal or scanning lines per one picture element are connected thereto through each switching element or that one picture element is divided into at least two equivalent pieces having one display electrode connected to the scanning and signal lines through the switching element coupled to the display electrode so as to drive each piece independently and the two neighboring picture elements belonging to different rows or columns of the matrix are staggered with each other by a distance equal to half width of the picture element Thus, if one switching element or switching elements or one signal or scanning line is defective, the other elements or lines may drive the associated liquid crystal picture element or its pieces and further a beautiful oblique or curved line can effectively be produced on the panel without forming echelon images

BRIEF DESCRIPTION OF THE DRAWINGS

The above and further objects, features and advantages of this invention will become more apparent from the following detailed description which is described referring to the accompanying drawings, wherein:

FIGS. 3 to 9 are explanatory diagrams of different embodiments of the liquid crystal display panel according to the present invention.

A liquid crystal display panel in the prior art is explanatorily shown in FIG. 1. In FIG. 1, a picture element 1 comprises a pair of display electrodes 2 (counter or upper electrode is not shown in this figure), one switching element 3, one signal line 4 and one scanning line 5. A plurality of parallel arranged scanning lines 5 are deposited on a glass substrate and a plurality of signal lines 4 are arranged orthogonally to the scanning lines 5 on the glass substrate. Every crossing has one switching element 3, for instance, TFT with a gate connected to the scanning line 5, a source connected to the signal line 4 and a drain connected to a lower electrode. In an actual design, parts of the scanning lines 5 at the crossing with signal line 4 are used as gate electrodes of the TFT 3. After the scanning line 5 is covered with an insulator film, polycrystalline silicon or amorphous silicon is deposited on the insulator film at the parts of the scanning line 5 as a semiconductor material. Source electrodes continuous to the signal line 4 and drain electrodes continuous to the lower electrode are formed on the semi-conductor material at both sides of the scanning line 5. Thus, TFT's 3 are formed at every crossing of scanning and signal lines. The lower electrodes are to apply driving voltages to liquid crystal in picture elements 1.

The thus prepared driving circuit panel is covered with a liquid crystal via a shading film, a passivation film and an orientation film. A transparent cap having a deposited transparent conductive layer as an upper electrode on a lower surface covers the liquid crystal. The driving voltage is applied to the liquid crystal maintained between the lower electrode connected to TFT 3 selected by scanning and signal voltage and the upper electrode Thus, the scanning of the display is performed by shifting the phases of pulses in accordance with the scanning line 5. The information to be reproduced on the display panel is applied on the signal lines 4 in synchronism with the scanning signal The signal voltage depends on the information and is generally lower than 10 volts. The polarity of the signal voltage is changed alternately at every scanning period to protect the liquid crystal from deterioration.

A problem of the liquid crystal display panel of the prior art is such that echelon images are formed on the display panel, if one wants to display an oblique line or a curved line, due to the arrangement of the picture elements in the matrix. Another problem thereof is such that one picture element is completely broken if at least one of signal line, scanning line and switching element connected thereto is broken This is mainly due to the low yield of the TFT used as the switching element.

Figure 1:
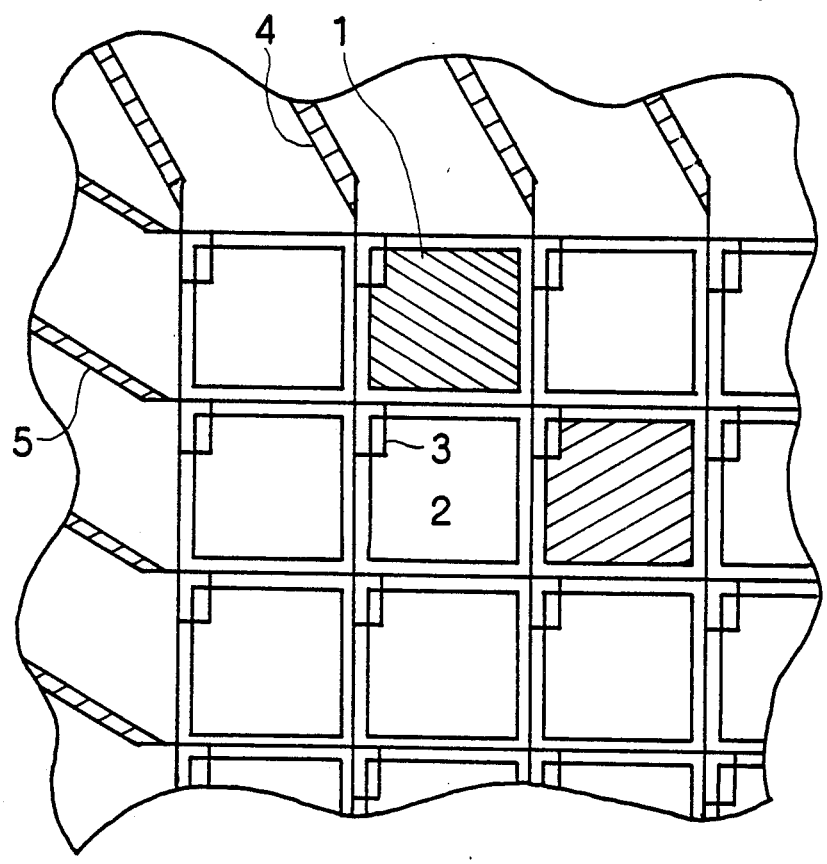
FIG. 1 is an explanatory diagram of a part of driving circuit panel used in a liquid crystal display panel in the prior art.
Figure 2:
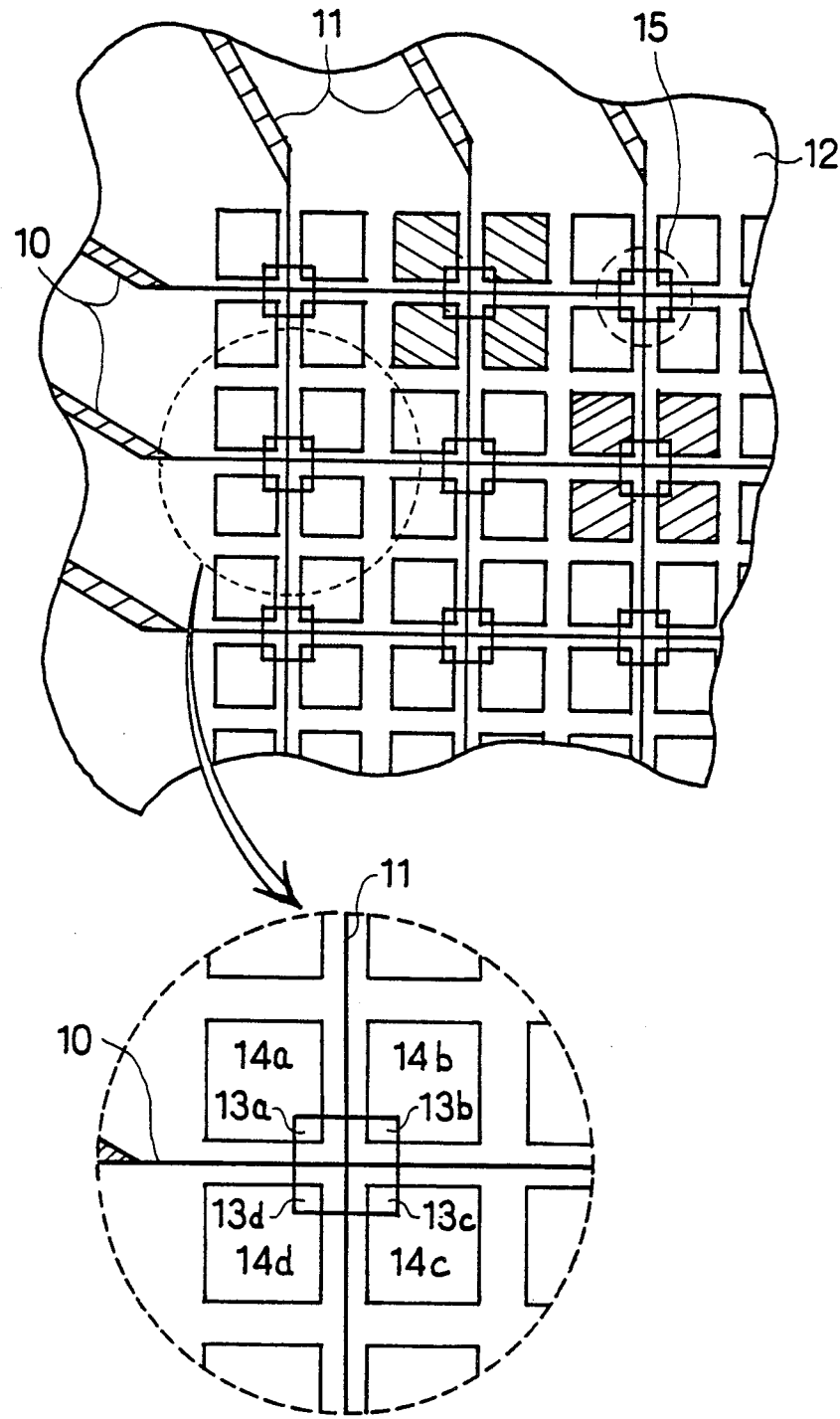
FIG. 2 is the same diagram as FIG. 1 and shows a part of driving circuit panel used in another liquid crystal display panel in the prior art.

The latter problem has been overcome by the use of the liquid crystal matrix display developed and already claimed in commonly-assigned pending patent application Serial No. 667,887 by Saito filed Nov. 2, 1984. The liquid crystal display panel is shown in FIG. 2 and comprises a plurality of scanning lines 10 and a plurality of signal lines 11 disposed on an glass substrate 12 in a orthogonal relationship to the scanning lines 10; four TFTs (13a to 13d) and four lower electrodes (14a to 14d) disposed to form one picture element 15 which is divided into four pieces (15a to 15d). The whole surface is covered with liquid crystal such as twisted nematic type via a shading layer, a passivation film and an orientation film. The liquid crystal is further covered with a cover plate composed of a transparent insulator plate having a transparent conductive layer on the inner surface. The transparent conductive layer acts as a common upper electrode of the liquid crystal display elements.

According to this liquid crystal display panel, one picture element is divided into four pieces and each piece is independently provided with one switching element in order to drive each piece independently and therefore, the possibility that the whole picture element (four pieces) would be broken at the same time can be significantly reduced. That is, one conventional picture element is divided into two at each crossing in this improved liquid crystal display panel and therefore, if one of the switching elements is broken, the other drives the associated liquid crystal display element. This results in the reduction of areas of defective elements on the display panel. Actually, the non-defective part visually prevails to the defective part to compensate the whole picture on the panel. Thus, the visually defective elements are remarkably reduced For instance, if the yield of the switching element is 99.9 % and the display panel has a 500 (rows) × 500 (columns) matrix of picture elements, 500,000 liquid crystal display elements are present and the same number of switching elements are formed on one panel. In this case, the number of defective switching elements are assumed to be 500 and this means that the same number of liquid crystal display elements does not work in the classical display panel While the above mentioned improved panel allows to reduce the number of defective picture elements to 1/500 of the classical one.

However, this liquid crystal display panel cannot allow to solve the first problem mentioned above In addition, in this display panel, the following fact is not taken into consideration that the picture element is also affected by the breakage of the signal or scanning lines Therefore, there remains room for further improvement of the construction of liquid crystal display panel.

The liquid crystal display panel according to this invention makes it possible to solve the problems by arranging the picture elements such that each pair of the neighboring picture elements belonging to different columns or rows is staggered with each other by a distance equal to half width of the picture element or by connecting one picture element with a plurality of scanning lines and/or signal lines.

DESCRIPTION OF THE PREFERRED EMBODIMENTS

The liquid crystal display panel according to the invention will now be explained in more detail referring to the preferred embodiments which are described with reference to the attached drawings.

Figure 3:
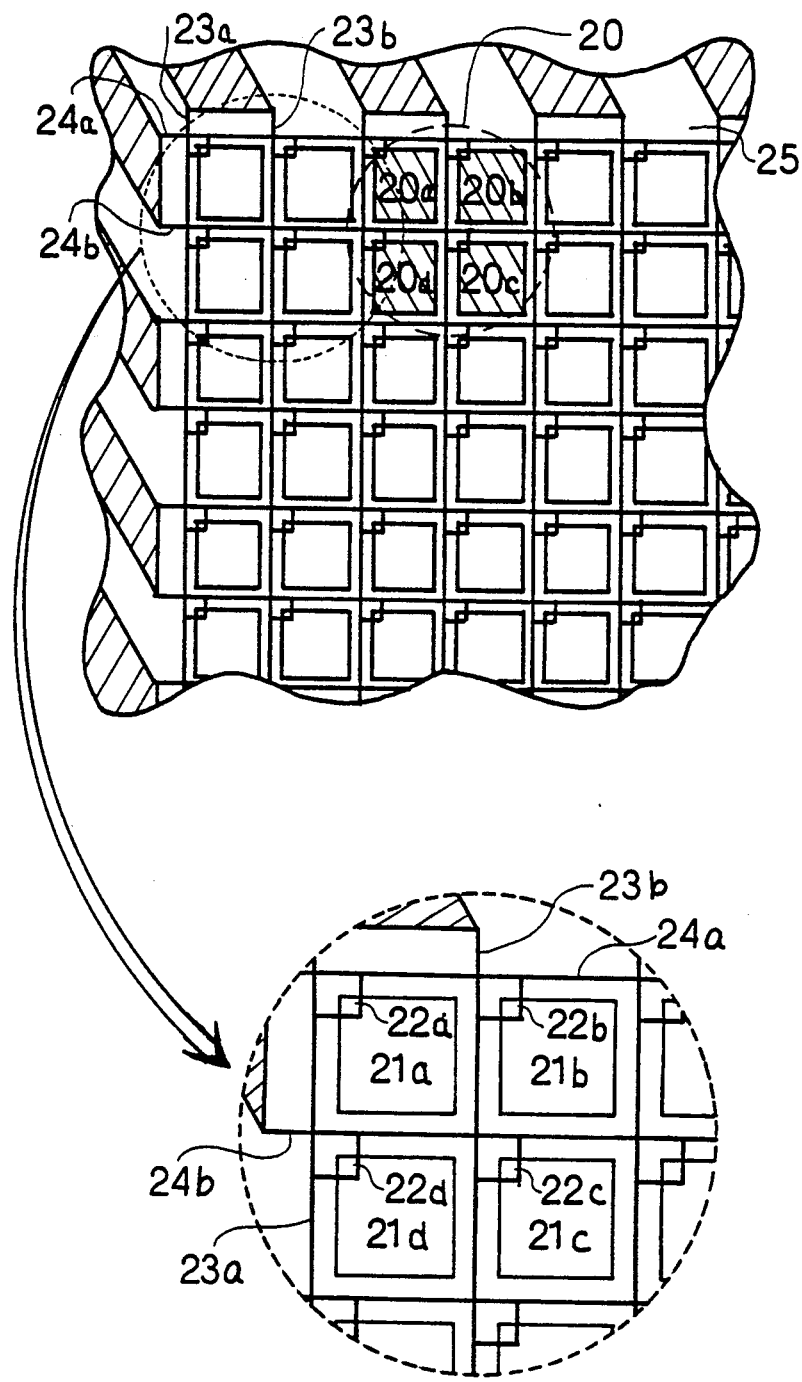

FIG. 3 shows an explanatory diagram of the first preferred embodiment according to the invention, in which a part of an active matrix substrate is shown, and in the liquid crystal display panel one picture element 20 is divided into four equivalent pieces (20a, ..., 20d) and this is principally composed of four display electrodes 21a, 21b 21c, 21d, four switching elements 22a, 22b, 22c, 22d and two signal lines 23 and two scanning lines 24. The pitch of the picture element 20 is, for example, 250 μm and the size of one display electrode is 100 μm × 105 μm. The switching element 22 is an amorphous silicon thin film transistor having the channel length of 8 μm and the channel width of 80 μm. In addition to minimize the probability of the occurrence of defects of the TFT, the TFT's are uniformly spaced apart within one picture element as shown in FIG. 3.

In this liquid crystal display panel, there are two scanning lines and two switching lines and gates of the TFT's (21a, 21b) are connected to the scanning line 24a and those of the TFT's (21c, 21d) are connected to the scanning line 24b, while sources of TFT's (21a, 21d) are connected to the signal line 23a and those of the TFT's (21b, 21c) are connected to the signal line 23b. The drains of the switching elements are connected to the display electrodes to drive the picture elements These scanning lines and signal lines are formed on a glass substrate 25 and electrically isolated with each other. The switching elements are formed at each one of the crossing points of the scanning lines and the signal lines The whole panel is covered with a shading film, a passivation film and an orientation film on which a liquid crystal such as nematic liquid crystals is disposed. The liquid crystal is covered with a cover plate composed of a transparent insulator plate such as a glass plate having a transparent conductive layer (composed of, for instance ITO or NESA) on its inner surface This transparent conductive layer operates as a common upper electrode.

Comparing the result obtained by using a prior art liquid crystal display panel having one display electrode per one picture element with those obtained by using the liquid crystal panel having four display electrodes per picture element, the display characteristics are almost at the same level. This fact demonstrates that the smaller the area of electrode, the lower the electric current is required to switch the liquid crystal and that identical display characteristics may be attained even if the channel width is 50 μm to 100 μm which is about ¼ to ½ of the channel length of the prior art one.

The probability of causing picture defects within one picture element due to the defective TFT is 0.05 % when the prior art liquid crystal display panel is used, while if the liquid crystal display panel according to the present invention is used the probability is less than 0.00001 %, since three pieces of one picture element work well although the same probability of causing display defects as in the case of the prior art one is assumed with respect to each piece. As a result, no display defect is observed in a display panel having 450,000 picture elements.

This surprising effect can be accomplished because the TFT's are uniformly distributed within one picture element so that four TFT's are rarely broken at the same time and the possibility of causing defects is remarkably reduced by shortening the channel length of the TFT's and further by using a plurality of scanning and/or signal lines.

Figure 4:
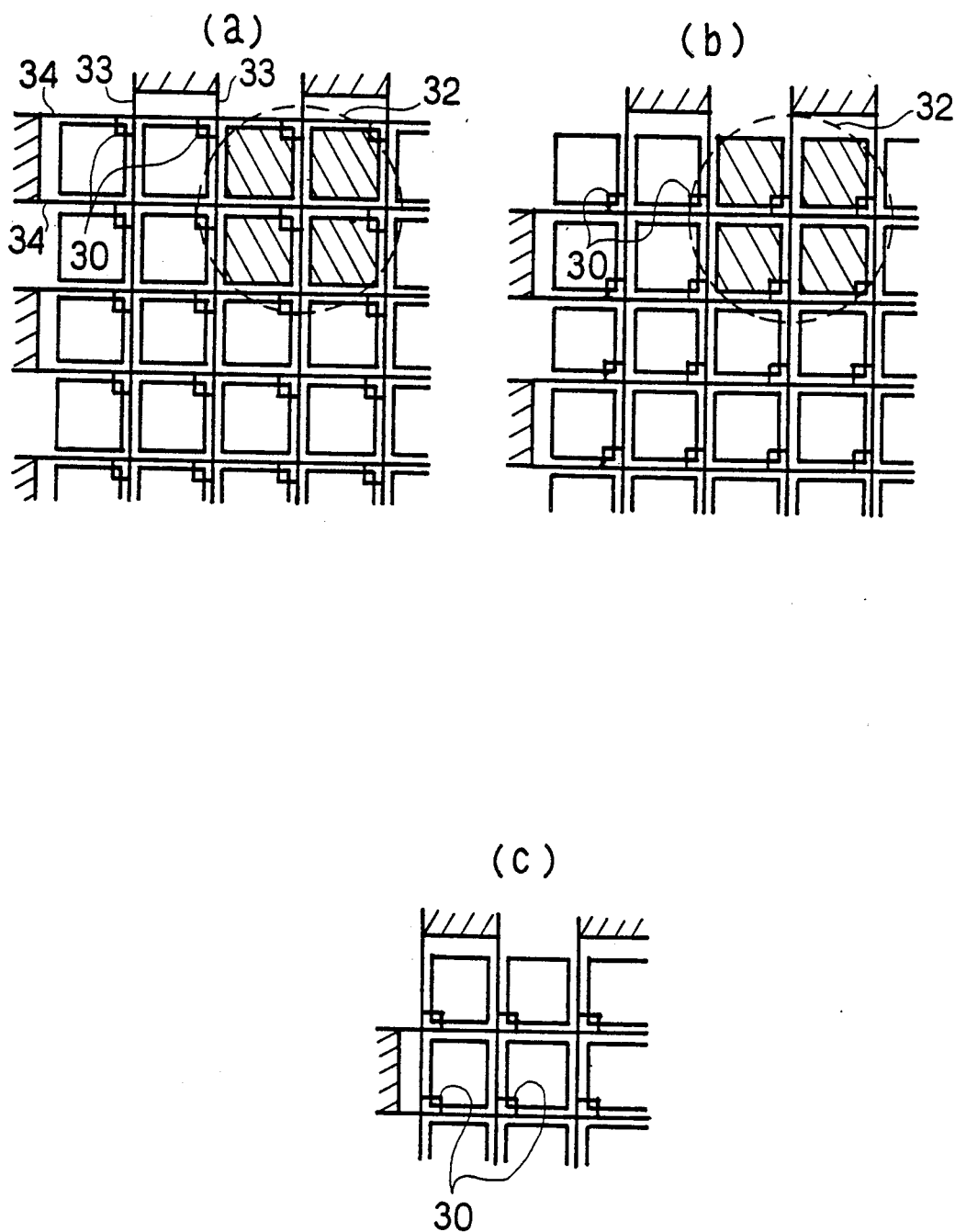

Other embodiments of the active matrix substrates in which the switching elements are uniformly spaced apart from each other within one picture element are, for example, shown in FIGS. 4 (a) to 4 (c). In these modifications, each switching element 30 is arranged in the respective manners shown in FIGS. 4 (a) to 4 (c). In these figures, the shaded areas refer to a group of display electrodes 31 which construct one picture element 32 and the signal line and scanning line are expressed as the reference numbers 33 and 34 respectively.

Figure 5:
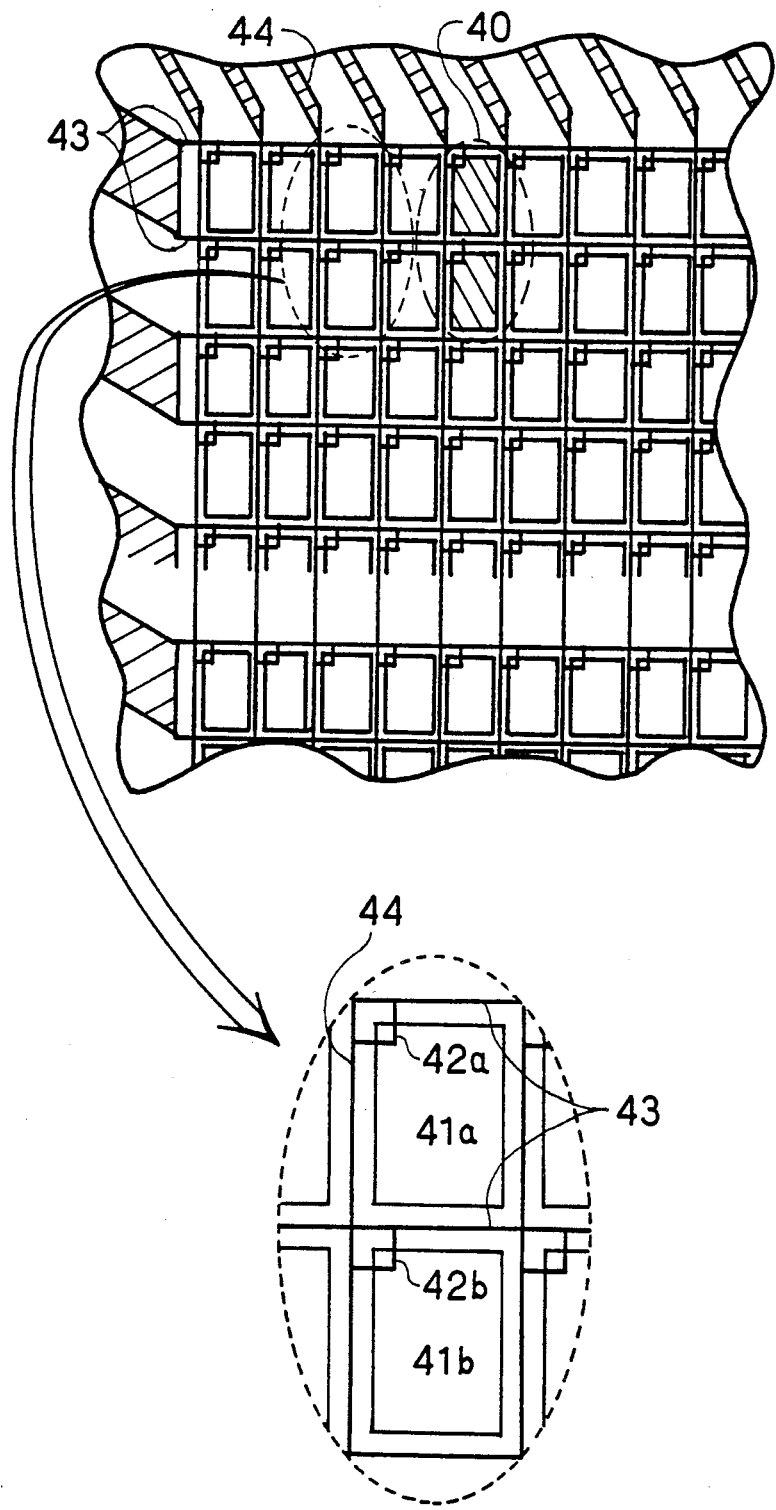

The second embodiment of the present invention has a picture element which is divided into two pieces as shown in FIG. 5 which shows a part of an explanatory plan view of another active matrix substrate according to the present invention. In the active matrix substrate, one picture element 40 which is divided into two pieces is mainly composed of two display electrodes 41a, 41b, two switching elements 42a, 42b, two scanning lines 43 and a signal line 44. This embodiment is effective when the aspect ratio of one picture element is approximately 2. For example, the size of the picture element 40 is 150 μm × 300 μm, and two display electrodes 41a, 41b having a size of 120 μm × 125 μm are used. The switching element 42 is an amorphous silicon thin film transistor (a-Si TFT), the channel length of which is 10 μm and the channel width of which is 100 μm. In addition, the line width of the scanning line 43 and the signal line 44 is equal to 15 μm. In order to minimize the occurrence of defects of a-Si TFT's, the switching elements 42 are dispersed uniformly throughout the picture element. To the switching element of a-Si TFT, the display electrode 41, the scanning line 43 and the signal line 44 are connected at its drain, gate and source respectively.

Figure 6:
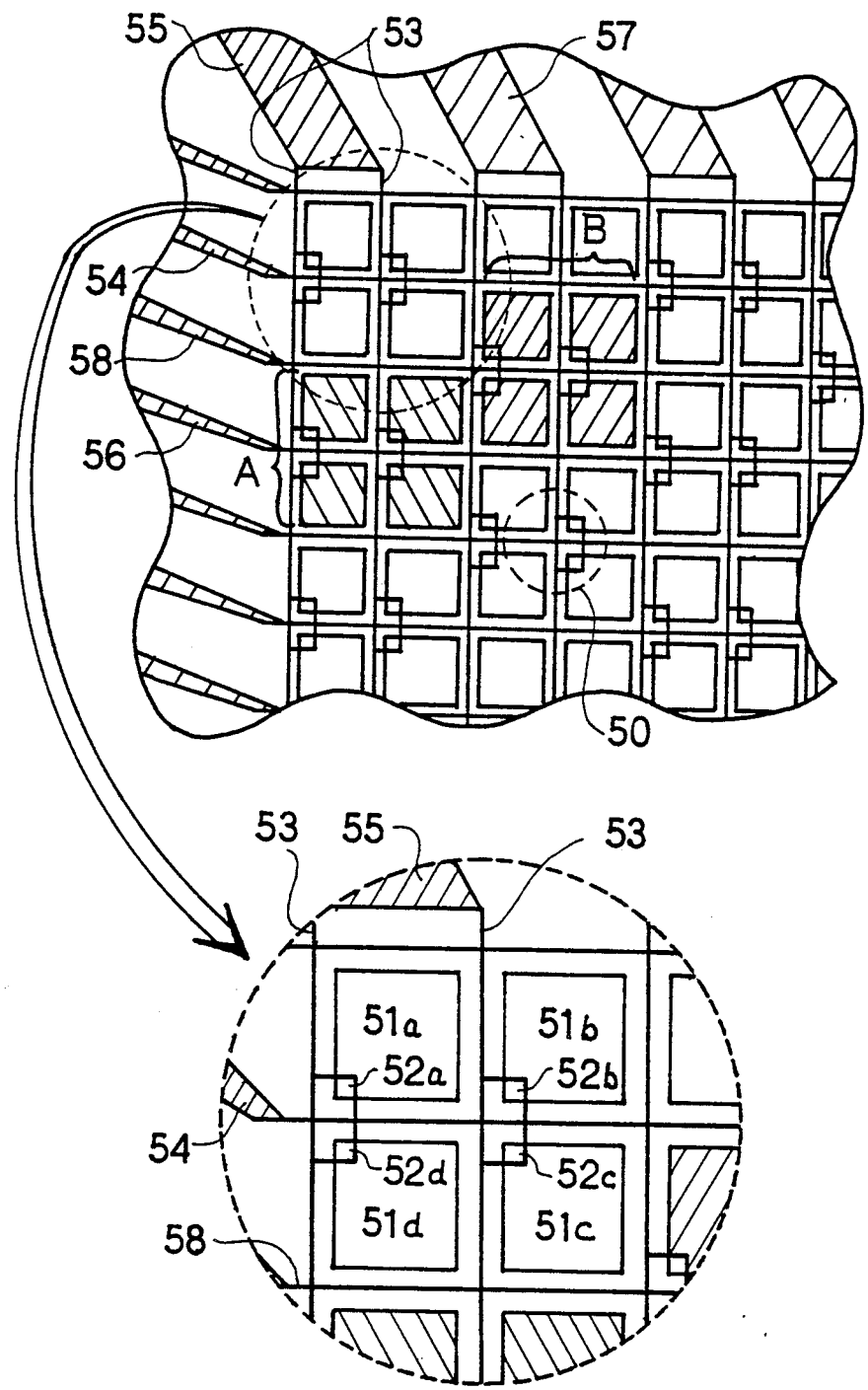

According to such structure, there is no picture element in which all the pieces constituting one picture element are broken when testing a display panel having 75,000 picture elements. That is, the possibility of the occurrence of defects in the prior art display panel is 0.05 %, while that of the display panel according to this embodiment the present invention is at most only 0.001 %. Thus, according to the display panel of this invention, the probability of the occurrence of defects can remarkably be reduced due to the synergistic effect which results from the increase in the number of switching elements, the uniformly dispersed arrangement of the switching elements within one picture element, the miniaturization thereof, the use of a plurality of scanning lines and the use of small display electrodes obtained by the division of one picture element A further preferred embodiment of this invention is shown in FIG. 6, in which the liquid crystal display panel is composed of picture elements 50, each of which is divided into four pieces (50a, 50b, 50c, 50d). The picture element 50 comprises four pairs of display electrodes 51a, 51b, 51c, 51d (the counter or upper electrodes are not shown in the figure), four switching elements 52a, 52b, 52c, 52d, one scanning line 54 and two signal lines 53. In this embodiment, each pair of the neighboring picture elements are arranged in a staggered state with each other by a distance equal to one half of the width or length of the picture element. The four switching elements are disposed at each crossing point of the scanning lines 54 with the signal lines 53. In this embodiment, the two signal line 53 may be a common signal line 55 having a width equal to that of the picture element, outside the display region.

Figure 7:
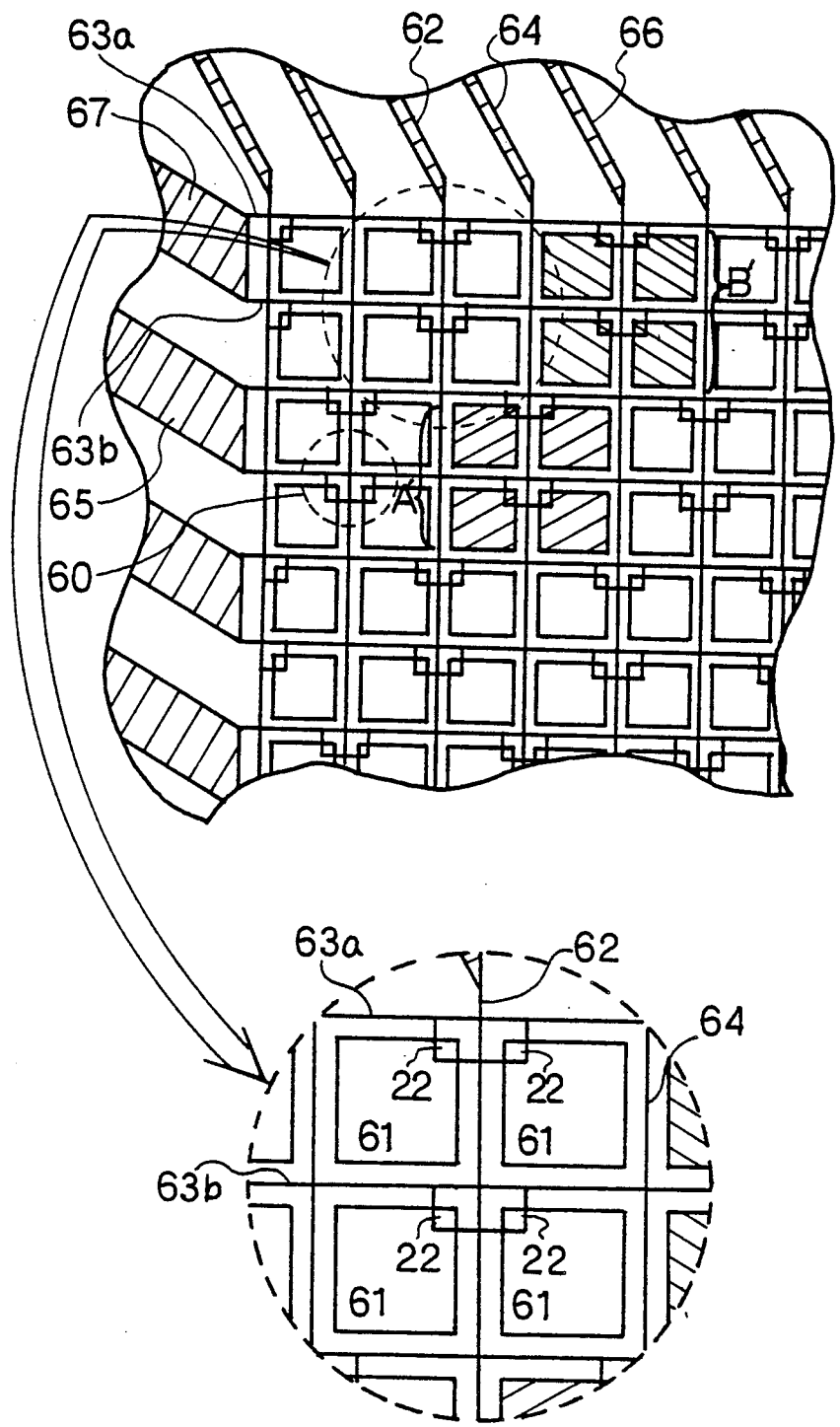

In the embodiment shown in FIG. 6, each pair of the neighboring picture elements belonging to different rows of the matrix are staggered with each other by a distance equal to half the width of the picture element in the vertical direction. However, these elements may also be staggered by the same distance in the horizontal direction. This embodiment has such an arrangement as shown in FIG. 7. In this embodiment, a picture element 60 comprises four pairs of display electrodes 61 (the counter electrodes are not shown in FIG. 7) and one signal line 62 and two scanning lines 63a and 63b connected to the electrodes through four switching elements. The switching elements are disposed at crossing points of the scanning lines and the signal lines.

The picture element A in FIG. 6 is operated by the common signal line 55 and the scanning line 56, while the picture element B which is off to the upper right of A is operated by the neighboring common signal line 57 and the scanning line 58. On the other hand, the picture element A' shown in FIG. 7 is operated by a signal line 64 and a common scanning line 65, the picture element B' which is situated at the position upper right hand side of A' is operated by the neighboring signal line 66 and a common scanning line 67.

According to the embodiments shown in FIGS. 6 and 7, images obtained do not have echelon form and they offer the beautiful display of oblique or curved lines. Furthermore, the possibility that all the pieces constructing one picture element are damaged at the same time is significantly reduced to the extent of $(\chi)^{-n}$ times lower than that of the prior art, wherein $\chi$ represents the probability of the occurrence of defects with respect to the switching element if one switching element is disposed per picture element and n stands for number of switching elements per picture element, since one picture element is independently operated by four switching elements and two signal lines or scanning lines.

A still another preferred embodiment in which one picture element is divided into two pieces is shown in FIG. 8. In this embodiment, one picture element 70 comprises two pairs of display electrodes 71 (wherein the counter electrode is not shown), two switching elements 72, one signal line 73 and one scanning line 74. In this embodiment, the picture element A" is operated by a signal line 75 and a scanning line 76 and the picture element B" which is situated at the position upper right hand side of A" is operated by the neighboring signal line 77 and the scanning line 74.

A further preferred embodiment of the liquid crystal display panel is shown in an explanatory diagram (FIG. 9) in which one signal line and one scanning line are used. The active matrix substrate comprises a plurality of picture elements 80, a plurality of signal lines 81 and a plurality of scanning lines 82. Each picture element is divided into four pieces and comprises four display electrodes (83a, ..., 83d) and four switching elements (84a, ... 84d) which are connected to the scanning and signal lines to drive the picture element. These display electrodes are connected to the scanning line and signal line through the switching element disposed on each electrode. In this embodiment, the scanning lines and signal lines are arranged so that they divide one picture element into two equivalent parts at the center thereof in both horizontal and vertical directions and therefore, the picture elements may be arranged so that each pair of the neighboring elements are staggered with each other by a distance equal to one half of the width of the picture element in the horizontal direction or the vertical direction.

The picture element A TM is operated by a signal line 81 and a scanning line 85, while the picture element B TM which is positioned to the upper right hand side of A TM is operated by a signal line 86 and a scanning line 87 in this embodiment.

According to this embodiment, the same effects as mentioned above with reference to the embodiments shown in FIGS. 7 and 8.

In all the embodiments (FIGS. 3 to 9), the switching element used is prepared according to a known process (see, for example, P. G. Le Comber et al., Journal de Physique, Colloque C4, supplement au n° 10, Tome 42, octobre 1981, 423-432; Japan Display ('83, 356-359; U.S. Pat. Nos. 4,402,731; 4,426,407) and may be a-Si thin film transistors or diodes, polycrystalline silicon thin film transistors or diodes or MIM element (Metal-Insulator-Metal type electron emitting element).

Although the present invention is explained referring to several preferred embodiments, it is apparent to those skilled in the art that the present invention can be equally applied to other types of liquid crystal display panels successfully and that the above embodiment may be variously modified. For instance, the twisted nematic type of liquid crystal may be exchanged with other type of liquid crystals.

We claim:

1. An active matrix liquid crystal display panel comprising:
    a plurality of picture elements formed on an insulating substrate in the form of a matrix,
    a plurality of scanning lines arranged to define rows of the matrix, and
    a plurality of signal lines arranged to define columns of the matrix,
    each picture element being divided into a plural number of display electrodes,
    each display electrode being connected to one of said plurality of scanning lines and one of said plurality of signal lines through a switching element, and
    wherein each pair of adjacent picture elements respectively belonging to different rows or columns of the matrix are staggered with respect to each other a width of one of said display electrodes in a horizontal or vertical direction respectively;
    said display electrodes interposed between said scanning lines thereby separating said scanning lines from each other by at least a width of said display electrodes; and
    said display electrodes interposed between each adjacent signal line whereby separating said signal lines from each other by at least the width of one of said display electrodes.

2. A liquid crystal display panel according to claim 1 wherein the picture element is divided into two equivalent pieces and comprises two separate display electrodes connected to the same scanning and signal lines through two respective switching elements 3. A liquid crystal display panel according to claim 1 wherein the switching elements included in one picture element are situated at one crossing point of the scanning line and the signal line.

4. A liquid crystal display panel according to claim 1 wherein all the switching elements included in one picture element are disposed at different crossing points of the scanning lines and the signal lines 5. A liquid crystal display panel according to claim 1 wherein the switching element is a member selected from the group consisting of thin film transistors of diodes of amorphous silicon, polycrystalline silicon or a compound semiconductor and metal-insulator-metal type electron emitting elements.

6. A liquid crystal display panel according to claim 1, wherein no more than one scanning line and no more than one signal line is interposed between said display electrode.

7. An active matrix liquid crystal display panel comprising:
    a plurality of picture elements formed on an insulating substrate in the form of a matrix,
    a plurality of scanning lines arranged to define rows of the matrix, and
    a plurality of signal lines arranged to define columns of the matrix,
    each picture element being divided into a plurality of display electrodes,
    each display electrode being connected to one of said plurality of scanning lines and one of said plurality of signal lines through a switching element,
    each pair of the adjacent picture elements respectively, belonging to different rows or columns of the matrix are staggered with respect to each other at least a width of one of said display electrodes pieces in a horizontal or vertical direction respectively, and
    wherein at least one of the scanning lines and the signal lines connected to one picture element consists of a plurality of sub-lines and said display electrodes are interposed between adjacent sub-lines thereby separating said sub-lines by at least the width of one of said display electrodes.

8. A liquid crystal display panel according to claim 7 in which the scanning line connected to one picture element consists of two sub-lines.

9. A liquid crystal display panel according to claim 8 wherein the signal line connected to one picture element consists of two sub-lines.

10. A liquid crystal display panel according to claim 7 wherein one picture element is divided into four pieces and two signal lines are connected to the picture element.

11. An active matrix liquid crystal display panel comprising:
    a plurality of picture elements formed on an insulating substrate in the form of a matrix,
    a plurality of scanning lines arranged to define rows of the matrix, and
    a plurality of signal lines arranged to define columns of the matrix,
    each picture element being divided into a plural number of display electrodes,
    each display electrode being connected to one of said plurality of scanning lines and one of said plurality of signal lines through a switching element, and
    wherein each pair of adjacent picture elements respectively belonging to different rows or columns of the matrix are staggered with respect to each other a width of one of said display electrodes in a horizontal or vertical direction respectively;
    said display electrodes interposed between said scanning lines thereby separating said scanning lines from each other by at least a width of said display electrodes;
    said display electrodes interposed between said signal lines thereby separating said signal lines from each other by at least the width of said display electrodes, and
    wherein each picture element is composed of four equivalent pieces and includes four corresponding display electrodes which are connected to the same scanning and signal lines at their crossing points through respective four switching elements.

12. An active matrix liquid crystal display panel comprising: a plurality of picture elements arranged in a matrix form, each of said picture elements being divided into a plurality of display electrodes; a plurality of straight scanning lines forming respective rows of the matrix; a plurality of straight signal lines forming respective columns of the matrix, each display electrode of each picture element being connected through an associated switching element to an associated one of the scanning lines and an associated one of the signal lines, and wherein at least one of the scanning lines and the signal lines connected to each picture element is divided into a plurality of sub-lines which are simultaneously driven and each of which is connected through one independent switching element to a corresponding one of said display electrodes included in the same picture element; wherein each pair of adjacent picture elements respectively belonging to different rows or columns of the matrix are staggered with respect to each other by at least a width of one of said display electrodes in a horizontal or vertical direction respectively and said sub-lines are located between said display electrodes so as to separate said sub-lines by at least the width of one of said display electrodes.

13. A liquid crystal display panel according to claim 12 in which each picture element is divided into four equivalent pieces and includes four display electrodes each of which is connected to the scanning and the signal lines independently through the switching elements.

14. A liquid crystal display panel according to claim 12 wherein the switching element is a member selected from the group consisting of thin film transistors and diodes of amorphous silicon, polycrystalline silicon or a compound semiconductor and metal-insulator-metal type electron emitting elements.

15. An active matrix liquid crystal display panel comprising:
   a plurality of picture elements arranged in a matrix form, each of said picture elements being divided into first through fourth electrode pieces so that each picture element is divided into four sub-elements;
   a plurality of straight main scanning lines forming respective rows of the matrix, each of said main scanning lines including first and second commonly-driven scanning sublines;
   a plurality of straight main signal lines forming respective columns of the matrix, each of said main signal lines including first and second commonly-driven signal sub-lines; and
   wherein within each picture element said first electrode piece is connected through a first associated switching element to a first scanning sub-line of an associated one of the main scanning lines and a first signal subline of an associated one of the main signal lines, said second electrode piece is connected through a second associated switching element to said first scanning sub-line of said associated main scanning line and a second signal subline of said associated main signal line, said third electrode piece is connected through a third associated switching element to a second scanning sub-line of said associated main scanning line and said first signal sub-line of said associated main signal line, and said fourth electrode piece is connected through a fourth switching element to said second scanning sub-line of said associated main scanning line and said second signal subline of said associated main signal line.

* * * * *